United States Patent
Mohmeyer et al.

(10) Patent No.: US 9,492,957 B2
(45) Date of Patent: Nov. 15, 2016

(54) EXTRUDED PLASTICS PROFILES COMPRISING CONTINUOUSLY INTRODUCED INSULATION ELEMENTS

(75) Inventors: Nils Mohmeyer, Osnabrueck (DE); Ulrich Gaukesbrink, Belm (DE); Christof Grieser-Schmitz, Osnabrueck (DE); Jörg Krogmann, Lohne (DE)

(73) Assignee: BASF SE, Ludwigshafen (DE)

( * ) Notice: Subject to any disclaimer, the term of this patent is extended or adjusted under 35 U.S.C. 154(b) by 565 days.

(21) Appl. No.: 13/456,688

(22) Filed: Apr. 26, 2012

(65) Prior Publication Data
US 2012/0276322 A1 Nov. 1, 2012

Related U.S. Application Data

(60) Provisional application No. 61/479,409, filed on Apr. 27, 2011.

(51) Int. Cl.
 *B29C 44/32* (2006.01)
 *B29C 47/00* (2006.01)
 *B29C 47/10* (2006.01)

(52) U.S. Cl.
 CPC ......... *B29C 44/324* (2013.01); *B29C 47/003* (2013.01); *B29C 47/0023* (2013.01); *B29C 47/0028* (2013.01); *B29C 47/1036* (2013.01); *B29C 47/1045* (2013.01); *Y10T 428/233* (2015.01); *Y10T 428/249953* (2015.04)

(58) Field of Classification Search
 None
 See application file for complete search history.

(56) References Cited

U.S. PATENT DOCUMENTS

| | | | |
|---|---|---|---|
| 4,492,063 A | 1/1985 | Schock et al. | |
| 5,653,923 A | 8/1997 | Spoo et al. | |
| 5,807,514 A * | 9/1998 | Grinshpun et al. | 264/46.6 |
| 6,881,365 B2 | 4/2005 | Topp | |
| 2002/0112428 A1 | 8/2002 | Dingler | |
| 2006/0186571 A1* | 8/2006 | Brown | C08G 18/0895 264/166 |
| 2006/0255488 A1 | 11/2006 | Lin | |
| 2007/0256379 A1* | 11/2007 | Edwards | B32B 5/18 52/309.9 |

(Continued)

FOREIGN PATENT DOCUMENTS

| | | |
|---|---|---|
| AU | 2106570 | 4/1972 |
| DE | 1 959 464 | 6/1971 |

(Continued)

OTHER PUBLICATIONS

International Search Report issued Aug. 1, 2012 in PCT/EP2012/057690 (with English translation of Category of Documents).

(Continued)

*Primary Examiner* — Jeffrey Wollschlager
(74) *Attorney, Agent, or Firm* — Oblon, McClelland, Maier & Neustadt, L.L.P.

(57) ABSTRACT

The present invention relates to a continuous process for producing a profile comprising at least one core made of a polyurethane foam or a mixture comprising a polyurethane foam, at least one jacket made of at least one thermoplastic material, and optionally at least one foil between core and jacket, to a profile produced via said process, to the use of this profile for producing windowframes, doorframes, or in the fitting-out of interiors, or in apparatuses in which, during operation, temperature differences arise between interior space and exterior space, and also to an apparatus for carrying out the process of the invention.

13 Claims, 4 Drawing Sheets

(56) References Cited

U.S. PATENT DOCUMENTS

Figure 1:
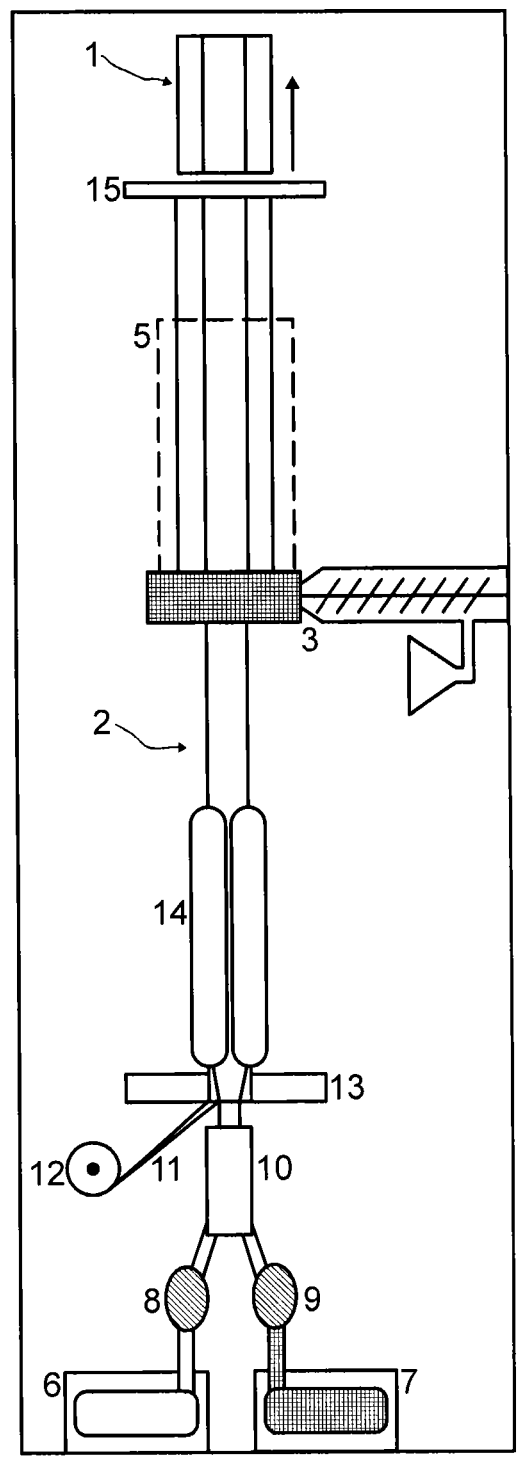

| | | | |
|---|---|---|---|
| 2008/0035228 A1* | 2/2008 | Bentley | B29C 44/22 138/127 |
| 2010/0048935 A1 | 2/2010 | Mijolovic et al. | |
| 2011/0175346 A1 | 7/2011 | Grieser-Schmitz et al. | |
| 2011/0308659 A1 | 12/2011 | Oeschger | |
| 2012/0196066 A1 | 8/2012 | Grieser-Schmitz et al. | |

FOREIGN PATENT DOCUMENTS

| | | |
|---|---|---|
| DE | 1 779 271 | 11/1972 |
| DE | 28 44 006 | 4/1980 |
| DE | 199 61 306 A1 | 7/2001 |
| DE | 101 24 333 A1 | 11/2002 |
| DE | 102 11 274 A1 | 9/2003 |
| DE | 102 34 007 A1 | 2/2004 |
| DE | 10 2004 023 881 A1 | 12/2005 |
| DE | 20 2009 003 392 U1 | 7/2009 |
| EP | 1 312 458 A1 | 5/2003 |
| EP | 1 595 904 A2 | 11/2005 |
| EP | 1595904 A2 * | 11/2005 |
| EP | 2 072 743 A2 | 6/2009 |
| EP | 2 213 440 A1 | 8/2010 |
| GB | 1157239 | 7/1969 |
| JP | 62-3911 | 1/1987 |
| JP | 48-30138 | 9/2011 |
| WO | WO 99/16996 A1 | 4/1999 |
| WO | WO 02/090703 A2 | 11/2002 |
| WO | WO 2009/098068 A1 | 8/2009 |
| WO | WO 2011/086025 A1 | 7/2011 |
| WO | WO 2012/101165 A2 | 8/2012 |

OTHER PUBLICATIONS

U.S. Appl. No. 13/423,503, filed Mar. 19, 2012, Tomasi, et al.
Office Action issued Mar. 8, 2016, in Japanese Patent Application No. 20140506877 filed Apr. 26, 2012 w/English translation.

* cited by examiner

EXTRUDED PLASTICS PROFILES COMPRISING CONTINUOUSLY INTRODUCED INSULATION ELEMENTS

The present invention relates to a continuous process for producing a profile comprising at least one core made of a polyurethane foam or a mixture comprising a polyurethane foam, at least one jacket made of at least one thermoplastic material, and optionally at least one foil between core and jacket, to a profile produced via said process, to the use of this profile for producing windowframes, doorframes, or in the fitting-out of interiors, or in apparatuses in which, during operation, temperature differences arise between interior space and exterior space, and also to an apparatus for carrying out the process of the invention.

The process of the invention can produce profiles from which windowframes or doorframes can be produced for house construction.

Within the prior art there are known processes for producing similar profiles and, respectively, windowframes or doorframes.

DE 28 44 006 A1 discloses a process for extruding plastics profiles which have a core made of foamed plastic enclosed on all sides by a jacket made of a plastic, where, in a single operation, the material for the jacket is introduced into the extruder die system, and at the same time the core material is introduced into the cavity of the shaped jacket, where gases introduced into the cavity of the jacket during the foaming of the core material are dissipated by way of the extruder die system. A problem with this process is that, although the gases generated are dissipated, the foam obtained in the profile is not particularly uniform. Another disadvantage of this process is that the reactive system for the foamed plastic has to be passed through the hot extruder die system, with disadvantages in terms of energy and of process technology.

WO 99/16996 A1 discloses a process for producing frame profiles for windows or doors, where the outer profile is first produced from a thermoplastic and then a foamable mixture based on a polyurethane is introduced into the profile, and when the mixture is foamed to fill the available space a strong adhesive bond is generated between exterior profile and foam. This document also discloses a process where a prefabricated, fully foamed core is inserted into the pre-shaped exterior profile.

DE 199 61 306 A1 likewise discloses a process for producing a profile via extrusion. This profile comprises an exterior shell and a foamed interior core. In this process, the exterior shell of the profile is first extruded, and then a foamable material is foamed to fill the available space.

DE 1 959 464 likewise discloses a process for continuously extruding continuous profiles with a jacket made of thermoplastic and with a foam core, where the jacket made of thermoplastic is first produced via extrusion and a foamable material is then used to fill the available space therein.

The process of DE 1 779 271 produces a flexible plastics profile strip by using extrusion to produce the flexible exterior sheath and the foamed core simultaneously.

US 2006/0255488 A1 likewise discloses a process for producing plastics profiles which have a foamed core, via simultaneous extrusion of the two materials, respectively in the molten state.

EP 2 072 743 A2 discloses a process for foaming to fill the available space in a hollow windowframe or hollow doorframe. For this, plastics profiles produced via extrusion are assembled to give finished windowframes or finished doorframes, and a foamable material is then introduced to fill the available space.

The prior art also discloses processes for producing these profiles having a foamed core where fully foamed inserts are inserted into the extruded profiles, see by way of example DE 202009003392 U1 or WO 02/090703 A2.

An example of a disadvantage of the processes mentioned from the prior art is that plastics profiles are produced via melt extrusion and then after a short time a foamable material has to be inserted into these profiles. The profiles are therefore still hot or at least warm, and this has an adverse effect on the filling of the available space by foamable material introduced. Furthermore, when foaming fills the available space of one chamber of the plastics profile in a continuous process it is possible to produce only profiles with one, and no more than one, chamber comprising foam, since the lance through which the reactive system is introduced has to be introduced into the profile. Another disadvantage is that the reactive polyurethane system has to be passed through the hot extruder die system.

In the light of the prior art, it is an object of the present invention to provide a continuous process which can produce profiles comprising at least one core made of a foamed material and one jacket made of a thermoplastic material, where a feature of the process is that it provides access to appropriate profiles which feature particularly uniform and homogeneous distribution of the foam within the profile chamber intended for that purpose. The foaming in the process is moreover intended to take place under conditions which permit ideal development of the foam. The process is moreover intended to permit avoidance of complicated process technology for the individual precursor compounds for jacket or core.

The invention achieves these objects via a continuous process for producing a profile comprising at least one core made of a polyurethane foam or a mixture comprising a polyurethane foam, one jacket made of at least one thermoplastic material, and optionally at least one foil between core and jacket, comprising at least the steps of:

(A) optionally introducing a foil into a gripper-belt system which has the shape of the profile,
(B) introducing at least one liquid, foamable reactive system of the core comprising a polyisocyanate a) and at least one higher molecular compound having groups reactive towards isocyanate groups into the gripper-belt system in such a way that any foil present at least to some extent encloses the reactive mixture,
(C) shaping of the core in the gripper-belt system,
(D) optionally cooling the core from step (C),
(E) introducing the core from step (C) or (D) into an extruder with attached extrusion die for producing hollow profiles, in order to sheath the core with a jacket made of at least one thermoplastic material and thus obtain the profile,
(F) optionally cooling the profile from step (E), and
(G) optional cutting of the profile from step (E) or (F).

The process of the invention serves for producing a profile comprising at least one core made of a polyurethane foam or a mixture comprising a polyurethane foam, at least one jacket made of at least one thermoplastic material, and optionally at least one foil between core and jacket.

The profile produced in the invention comprises at least one core made of a polyurethane foam or a mixture comprising a polyurethane foam.

In one particularly preferred embodiment, the at least one foamed material located in the core is a polyurethane foam.

Polyurethanes, in particular in foamed form, are known per se to the person skilled in the art, and are described by way of example in DE 10 124 333.

In the invention, it is particularly preferable to use rigid polyurethane foams in the core of the profile of the invention.

The polyurethane foam or the mixture comprising a polyurethane foam according to the present invention is obtained according to the present invention from a liquid reactive system comprising at least one polyisocyanate a) and at least one higher molecular compound having groups reactive towards isocyanate groups b).

In contrast to the processes known from the prior art in the process according to the present invention, not a readily polymerized material is introduced into the gripper-belt or the foil and foamed but a liquid reactive system, comprising the starting compounds for the preparation of polyurethane foams, i.e. at least one polyisocyanate a) and at least one higher molecular compound having groups being reactive towards isocyanate groups b), is introduced and the polymerization reaction for forming the polymeric polyurethanes and the foaming for preparation of the foam take place, preferably at the same time.

Polyurethane foams, in particular rigid polyurethane foams, have been known for a long time and are widely described in the literature. They are usually produced via reaction of organic polyisocyanates a) with compounds b1) having at least two groups reactive toward isocyanate groups, mostly polyols and/or polyamines. The at least one higher molecular compound having groups reactive towards isocyanate groups b) is according to the present invention preferably a compound having at least two groups reactive towards isocyanate groups b1).

Organic polyisocyanates a) that can be used are preferably aromatic polyfunctional isocyanates.

Individual examples that may be mentioned are tolylene 2,4- and 2,6-diisocyanate (TDI) and the corresponding isomer mixtures, diphenylmethane 4,4'-, 2,4'-, and 2,2'-diisocyanate (MDI) and the corresponding isomer mixtures, mixtures made of diphenylmethane 4,4' and 2,4'-diisocyanates, polyphenyl polymethylene polyisocyanates, mixtures made of diphenylmethane 4,4'-, 2,4'-, and 2,2'-diisocyanates, and of polyphenyl polymethylene polyisocyanates (crude MDI), and mixtures made of crude MDI and of tolylene diisocyanates. The organic di- and polyisocyanates can be used individually or in the form of mixtures.

Other materials often used are those known as modified polyfunctional isocyanates, i.e. products which are obtained via chemical reaction of organic di- and/or polyisocyanates. Examples that may be mentioned are di- and/or polyisocyanates comprising isocyanurate groups and/or comprising urethane groups. The modified polyisocyanates can optionally be mixed with one another or with unmodified organic polyisocyanates, e.g. diphenylmethane 2,4'- and/or 4,4'-diisocyanate, crude MDI, and/or tolylene 2,4- and/or 2,6-diisocyanate.

Materials that can also be used alongside these are reaction products of polyfunctional isocyanates with polyfunctional polyols so called polyisocyanate prepolymers, and also mixtures of these with other di- and polyisocyanates.

The polyisocyanate component a) is preferably introduced in the form of polyisocyanate prepolymers. These polyisocyanate prepolymers are obtainable by reaction of the above-mentioned polyisocyanates with polyols to obtain the prepolymer, for example at a temperature of 30 to 100° C., preferably at about 80° C. In a preferred embodiment, 4,4'-MDI is used with uretone imine modified MDI and commercially available polyols based on polyesters, for example on adipic acid, polyethers, for example based on ethylene oxide and/or propylene oxide or polytetrahydrofurane (PTHF) or polycarbonatols, for example as mentioned in European patent application EP 3007101407.0, are used for the preparation of prepolymers according to the present invention.

Polyols are known to the skilled artisan and are described for example in "Kunststoffhandbuch, Band 7, Polyurethane" Carl Hanser Verlag, 3. Auflage 1993, Kapitel 3.1. Prepolymers on ether basis are preferably obtained by reaction of polyisocyanates, particularly preferably 4,4'-MDI, with bi- to three-functional polyoxipropylene- and/or polyoxipropylene-polyoxyethylene polyols. Their preparation is usually conducted by the known basically catalyzed addition of propylene oxide alone, in mixture with ethylene oxide or blockwise to H-functional, preferably OH-functional starting compounds. Starting compounds are for example water, ethylene glycols or propylene glycols or glycerine or trimethylol propane. Further, as catalysts multimetal cyanide compounds, so called DMC-catalysts, can be used. Furthermore, catalysts of Lewis-acids, like bortrifluoride, can be used. Preferably polyethers are used as polyol, as mentioned under b) in the following.

When ethylene oxide-/propylene oxide mixtures are used, ethylene oxide is used in an amount of 10 to 50% by weight, in respect of the total amount of alkylene oxide. The integration of alkylene oxides can take place blockwise or as a statistical mixture. Particularly preferred is addition of an ethylene oxide- and endcap ("EO-cap") in order to increase the amount of more reactive primary OH-end groups. The number average molecular weight of the polyols is preferably between 400 and 4500 g/mol.

A material that has proven particularly successful as organic polyisocyanate is crude MDI having from 29 to 33% by weight NCO content and having a viscosity at 25° C. in the range from 150 to 1000 mPa·s.

As higher molecular compounds with groups reactive towards isocyanate groups b), preferably as compounds b1) which have at least two groups reactive towards isocyanate are in particular polyether alcohols and/or polyester alcohols, and/or polycarbonate alcohols having OH numbers in the range from 100 to 1200 mg KOH/g.

In a preferred embodiment according to the present invention mixtures comprising polyetherols and polyesterols are used as higher molecular compounds b).

Higher molecular compounds b) with groups reactive towards isocyanate groups have preferably a molecular weight of more than 400 g/mol according to the present invention, preferably, the molecular weight is higher than 550 g/mol. The average functionality of the higher molecular compounds with groups reactive towards isocyanate groups is preferably less than 2.5.

The polyester alcohols are mostly produced via condensation of polyhydric alcohols, preferably diols, having from 2 to 12 carbon atoms, preferably from 2 to 6 carbon atoms, with polybasic carboxylic acids having from 2 to 12 carbon atoms, e.g. succinic acid, glutaric acid, adipic acid, suberic acid, azelaic acid, sebacic acid, decanedicarboxylic acid, maleic acid, fumaric acid, and preferably phthalic acid, isophthalic acid, terephthalic acid, and the isomeric naphthalenedicarboxylic acids.

The dicarboxylic acids can be used separately or as a mixture among one another. Instead of the free dicarboxylic acids, the corresponding dicarboxylic acid derivatives, for example dicarboxylic esters of alcohols with one to four carbon atoms or dicarboxylic acid anhydrides can be used.

Preferably, dicarboxylic acid mixtures of succinic-, glutaric- and adipic acid in proportions of for example 20 to 35:35 to 50:20 to 32:35 to 50:20 to 32 parts by weight, and preferably adipic acid. Examples of 2 and more valent alcohols, preferably diols are: ethane diol, diethylene glycol, 1,2- or 1,3-propane diol, dipropylene glycol, 1,4-butane diol, 1,5-pentane diol, 1,6-hexane diol, 1,10-decane diol, glycerine and trimethylol propane. Preferably, ethan diol, diethylene glycole, 1,4-butane diole, 1,5-pentane diol and 1,6-hexane diole are used. Moreover, polyester polyols of lactones, for example epsilon-caprolactone or hydroxycarboxylic acids, for example omega-hydroxycaproic acids, can be used.

For the preparation of polyester polyols, organic, for example aromatic and preferably aliphatic polycarboxylic acids and/or derivatives and polyvalent alcohols can be polycondensed without a catalyst or preferably in the presence of esterification catalyst, advantageously in an atmosphere of inert gas, for example nitrogen, carbon monoxide, helium, argon and others, in melt at temperatures of 150 to 250° C., preferably 180 to 220° C., optionally under decreased pressure, up to a desired acid number, which is preferably lower than 10, particularly preferably lower than 2. According to a preferred embodiment, the esterification mixture is polycondensed at above-mentioned temperatures up to an acid number of 80 to 30, preferably 40 to 30, under normal pressure and subsequently under a pressure of less than 500 mbar, preferably 50 to 150 mbar. Iron-, cadmium-, cobalt-, lead-, zinc-, antimony-, magnesium-, titanium- and tin-catalysts in the form of metals, metal oxides or metal salts can be used as esterification catalysts.

The polycondensation can also be conducted in liquid phase in the presence of dillution- and/or entrainers, for example benzene, toluene, xylene or chlorobenzene for aciotropic distillation of the condensation water. For the preparation of polyester polyols, organic polycarboxylic acids and/or derivatives and polyvalent alcohols are advantageously polycondensated in a molar ratio of 1:1 to 1.8, preferably 1:1.05 to 1.2.

The polyester polyols obtained advantageously have a functionality of 1.8 to 4, particularly preferably of 1.9 to 3 and particularly of 2.0 to 2.5 and a molecular weight of 480 to 5000, preferably 1000 to 4500 g/mol and preferably 1600 to 4500.

The functionality of the preferred polyether used in the invention is preferably from 2 to 8, in particular from 3 to 8.

In particular, it is possible to use polyether polyols b1H) which are produced by known processes, for example via anionic polymerization of alkylene oxides in the presence of catalysts, preferably alkali metal hydroxides, amines, or what are known as DMC catalysts.

Alkylene oxides mostly used are ethylene oxide and/or propylene oxide, preferably pure propylene 1,2-oxide.

Particular starter molecules that are used are compounds having at least 3, preferably from 4 to 8, hydroxy groups, or having at least two primary amino groups in the molecule.

Starter molecules which are used having at least 3, preferably from 4 to 8, hydroxy groups in the molecule are preferably trimethylolpropane, glycerol, toluenediamine, pentaerythritol, sugar compounds, such as glucose, sorbitol, mannitol, and sucrose, polyhydric phenols, resols, e.g. oligomeric condensates derived from phenol and formaldehyde, and Mannich condensates derived from phenols, formaldehyde, and from dialkanolamines, and also melamine.

Starter molecules used having at least two primary amino groups in the molecule are preferably aromatic di- and/or polyamines, e.g. phenylenediamines, tolylene-2,3-, 2,4-, 3,4-, and 2,6-diamine, and 4,4'-, 2,4'-, and 2,2'-diaminodiphenylmethane, and also aliphatic di- and polyamines, such as ethylenediamine.

The functionality of the polyether polyols is preferably from 3 to 8, and their hydroxy numbers are preferably from 100 mg KOH/g to 1200 mg KOH/g, and in particular from 240 mg KOH/g to 570 mg KOH/g.

Among the compounds b1) having at least two hydrogen atoms reactive toward isocyanate are also the optionally concomitantly used chain extenders and crosslinking agents. It can prove advantageous for modification of mechanical properties to add difunctional chain extenders, crosslinking agents of functionality 3 or higher, or else optionally mixtures thereof. Chain extenders and/or crosslinking agents used are preferably alkanolamines and in particular diols and/or triols having molecular weights smaller than 400, preferably from 60 to 300.

The amount advantageously used of chain extenders, crosslinking agents, or mixtures thereof is from 1 to 20% by weight, preferably from 2 to 5% by weight, based on polyol component b1).

Further information concerning the polyether alcohols and polyester alcohols used, and also production of these, is found by way of example in Kunststoffhandbuch [Plastics handbook], volume 7 "Polyurethane" [Polyurethanes], edited by Günter Oertel, Carl-Hanser-Verlag, Munich, 3$^{rd}$ edition, 1993, pages 57 to 74.

In an embodiment to which preference is further given, within the polyurethanes that are present in the invention within the core of the profile of the invention, there are further additives present, for example selected from the group consisting of flame retardants, surfactant substances, foam stabilizers, cell regulators, fillers, pigments, dyes, flame retardants, hydrolysis stabilizers, antistatic agents, agents having fungistatic and bacteriostatic effect, and mixtures thereof.

Flame retardants that can be used are organic phosphoric and or phosphonic esters. It is preferable to use compounds that are not reactive toward isocyanate groups. Among the preferred compounds are also phosphoric esters comprising chlorine. Typical representatives of this group of flame retardants are triethyl phosphate, diphenyl cresyl phosphate, tris(chloropropyl)phosphate, and also diethyl ethanephosphonate.

Alongside these, flame retardants comprising bromine can also be used. Flame retardants used comprising bromine are preferably compounds having groups reactive toward the isocyanate group. Compounds of this type are esters of tetrabromophthalic acid with aliphatic diols and alkoxylation products of dibromobutenediol. It is also possible to use compounds which derive from the group of the brominated neopentyl compounds comprising OH groups.

For production of the polyurethanes preferably used in the invention in the core of the profile of the invention it is usual to use blowing agents, catalysts, and cell stabilizers, and also, if necessary, further auxiliaries and/or additives.

Water can be used as blowing agent, and reacts with isocyanate groups with elimination of carbon dioxide. It is also possible to use what are known as physical blowing agents in combination with, or instead of, water. These are compounds which are inert toward the starting components and which are mostly liquid at room temperature, and which evaporate under the conditions of the urethane reaction. The boiling point of said compounds is preferably below 50° C. Among the physical blowing agents are also compounds which are gaseous at room temperature and which are introduced under pressure into the starting components or are dissolved therein, examples being carbon dioxide, low-boiling-point alkanes, and fluoroalkanes.

The compounds are mostly selected from the group consisting of alkanes and/or cycloalkanes having at least 4 carbon atoms, dialkyl ethers, esters, ketones, acetals, fluoroalkanes having from 1 to 8 carbon atoms, and tetraalkylsilanes having from 1 to 3 carbon atoms in the alkyl chain, in particular tetramethylsilane.

Examples that may be mentioned are propane, n-butane, iso- and cyclobutane, n-, iso-, and cyclopentane, cyclohexane, dimethyl ether, methyl ethyl ether, methyl butyl ether, methyl formate, acetone, and also fluoroalkanes which can be degraded in the troposphere and are not therefore hazardous to the ozone layer, e.g. trifluoromethane, difluoromethane, 1,1,1,3,3-pentafluorobutane, 1,1,1,3,3-pentafluoropropane, 1,1,1,2-tetrafluoroethane, difluoroethane, and heptafluoropropane; fluoroalkenes can also be used. The physical blowing agents mentioned can be used alone or in any desired combinations with one another.

Catalysts used are in particular compounds which greatly accelerate the reaction of the isocyanate groups with the groups reactive toward isocyanate groups. Examples of these catalysts are strongly basic amines, e.g. secondary aliphatic amines, imidazoles, amidines, and also alkanolamines.

If the intention is to incorporate isocyanurate groups into the polyurethane foam, specific catalysts are required. Usual isocyanurate catalysts used are metal carboxylates, in particular potassium acetate and solutions thereof.

As a function of requirement, the catalysts can be used alone or in any desired mixtures with one another.

Further additives used are the substances known per se for this purpose, for example surfactant substances, foam stabilizers, cell regulators, fillers, pigments, dyes, flame retardants, hydrolysis stabilizers, antistatic agents, agents having fungistatic and bacteriostatic effect.

More detailed information concerning a process for producing the polyurethanes preferably used in the invention, and also concerning the starting materials, blowing agents, and catalysts used, and also auxiliaries and/or additives is found by way of example in Kunststoffhandbuch [Plastics handbook], volume 7 "Polyurethane" [Polyurethanes], Carl-Hanser-Verlag, Munich, $1^{st}$ edition, 1966, $2^{nd}$ edition, 1983 and $3^{rd}$ edition, 1993, pages 104 to 192.

To produce the rigid polyurethane foams, the polyisocyanates a) and polyol component b) are reacted in amounts such that the isocyanate index is from 90 to 220, preferably from 100 to 200, in particular from 110 to 190.

The density of the rigid polyurethane foams preferably used in the invention is preferably from 10 to 400 kg/m$^3$, particularly preferably from 20 to 200 kg/m$^3$, very particularly preferably from 30 to 100 kg/m$^3$.

Details of the production of the polyurethane foams according to the invention are specified in steps (B) and (C).

The core of the profile of the invention can generally have any desired shape which appears to the person skilled in the art to be suitable for the desired application. The cross-sectional shape of the core can be round and/or angular. The core can moreover be of uniform or nonuniform shape and by way of example can have cavities, grooves, ridges, etc., where these profiling effects can run either parallel to or perpendicularly to the direction of production. In one preferred embodiment, the core shaped in step (C) of the process of the invention provides the shape of the profile to be produced or, respectively, provides the region enclosed by the insulating element. In another embodiment of the profile produced in the invention, for example in the case of a window profile, the core produced in the invention is sheathed by a jacket to which fillets have been bonded, onto which further fillets are then optionally bonded. The entirety made of core, jacket, and fillets forms the resultant profile of the invention.

The shape of the core is in turn prescribed via the shape of the gripper-belt system used in the invention. The dimensions of the core are generally from 5 to 250 mm, preferably from 10 to 150 mm, particularly preferably from 20 to 100 mm, in particular from 25 to 80 mm, and in the case of nonuniformly shaped cores these dimensions describe the greatest available distances in one direction.

The profile produced in the invention comprises at least one core made of a polyurethane foam or a mixture comprising a polyurethane foam. In one preferred embodiment, the profile produced in the invention comprises precisely one core made of a polyurethane foam or a mixture comprising a polyurethane foam. It is also possible in the invention that the profile has two, three or fore cores made of a polyurethane foam or a mixture comprising a polyurethane foam. If there are two, three, or four cores present in the profile produced in the invention, these can have identical or different shapes.

The profile produced in the invention comprises, alongside the at least one core, at least one jacket made of at least one thermoplastic material. The term "jacket" in the invention means a coating of the core of the profile of the invention. The jacket here encloses the core to some extent or entirely, preferably entirely. In one preferred embodiment, the jacket moreover has fillets bonded thereto.

The thickness of the jacket per se or of the jacket and of the optionally present fillets of the jacket is generally from 1 to 20 mm, preferably from 2 to 15 mm, particularly preferably from 3 to 10 mm, and the thicknesses of the jacket and of the fillets here can be different or identical. In one preferred embodiment, the jacket or the fillets has/have various thicknesses at various sites on the profile, where the thicknesses are identical in a longitudinal direction but can be different in a transverse direction. This is a function by way of example of the shape of the profile, which in turn is a function of the subsequent application.

The jacket of the profile to be produced in the invention generally comprises at least one thermoplastic material. Suitable thermoplastic materials are known per se to the person skilled in the art and by way of example are those selected from the group consisting of polyolefins, by way of example acrylonitrile-butadiene-styrene (ABS), polymethyl methacrylate (PMMA), polyethylene (PE), polypropylene (PP), polystyrene (PS), or polyvinyl chloride (PVC), polycondensates, such as polyamides (PA), e.g. PA 6 or PA 6,6, polylactate (PLA), polycarbonates (PC), polyesters, such as polyethylene terephthalate (PET), polyether ether ketone (PEEK), polyadducts, such as thermoplastic polyurethane, wood-plastics composites, and mixtures thereof. In a particularly preferred embodiment, the jcket of the profile to be produced in the invention comprises polyvinyl chloride (PVC). Polyvinyl chloride (PVC) and its preparation by polymerization of vinyl chloride is known per se to the person skilled in the art.

In one preferred embodiment, the jacket comprises a thermoplastic material which has a melting point below 220° C.

In the profile produced in the invention, there is optionally at least one foil between core and jacket. The term "foil" in the invention means a layer or coating optionally present between core and jacket in the profile produced in the invention. Said foil can generally be composed of any material which appears to the person skilled in the art to be suitable for the profile of the invention.

In one preferred embodiment, the foil optionally present between core and jacket comprises a material selected from the group consisting of thermoplastic polyurethane, polyolefins, such as polyethylene, polypropylene, polystyrene, polyvinyl chloride, and/or paper, paperboard, textiles, nonwovens, Teflon, metal, metal-plastics composite materials, and mixtures thereof. The materials mentioned, and processes for producing same, are known per se to the person skilled in the art. The invention can also use a foil which is composed of more than one material, the term used being composite materials.

In one particularly preferred embodiment, the foil comprises Teflon between core and jacket of the profile produced in the invention, and it is very particularly preferable that the foil is composed of Teflon. In this embodiment, the foil present prevents permanent adhesion of the core to the jacket, in such a way that articles produced from the profile produced in the invention, for example windowframes or doorframes, can easily be recycled after use, because the different plastics, for example polyurethane foam of the core and polyvinyl chloride of the jacket, can easily be separated from one another.

In another preferred embodiment, the foil comprises a thermoplastic polyurethane. The result is particularly strong adhesion of the foil to the core. Another result is particularly good adhesion of the foil to the jacket, the overall result therefore being particularly good and strong adhesion of the three components to one another, and a particularly stable profile. Thermoplastic polyurethanes preferably used are by way of example composed mainly of MDI and PTHF polyols, for example as described in DE 10234007.

In another preferred embodiment, the foil comprises a metal or a metal-plastics composite material, by way of example described in DE 10211274. In said embodiment, there is a gastight sheath around the core, which preferably comprises a polyurethane foam. It is thus possible in the invention that blowing agent, in particular pentane, present in the foam cannot escape by evaporation from the core. The core therefore also retains its low lambda value over a very long period, and the insulating effect of the core or of the entire profile therefore remains in essence constant over a long period.

The thickness of the foil which is optionally present between core and jacket is by way of example from 10 to 3000 µm, preferably from 25 to 1000 µm, particularly preferably from 50 to 750 µm, in particular from 100 to 500 µm.

A detailed explanation is provided below of the individual steps of the continuous process of the invention:

Step (A):

The optional step (A) of the process of the invention comprises introducing a foil into a gripper-belt system which has the shape of the profile.

Step (A) of the process of the invention is carried out if a foil is to be present between the core and the jacket of the profile to be produced. The invention preferably provides said foil in the form of a roll and introduces it by means of an unwind apparatus or, respectively, conveying apparatus known to the person skilled in the art into the actual apparatus for producing the profile.

Figure 2:
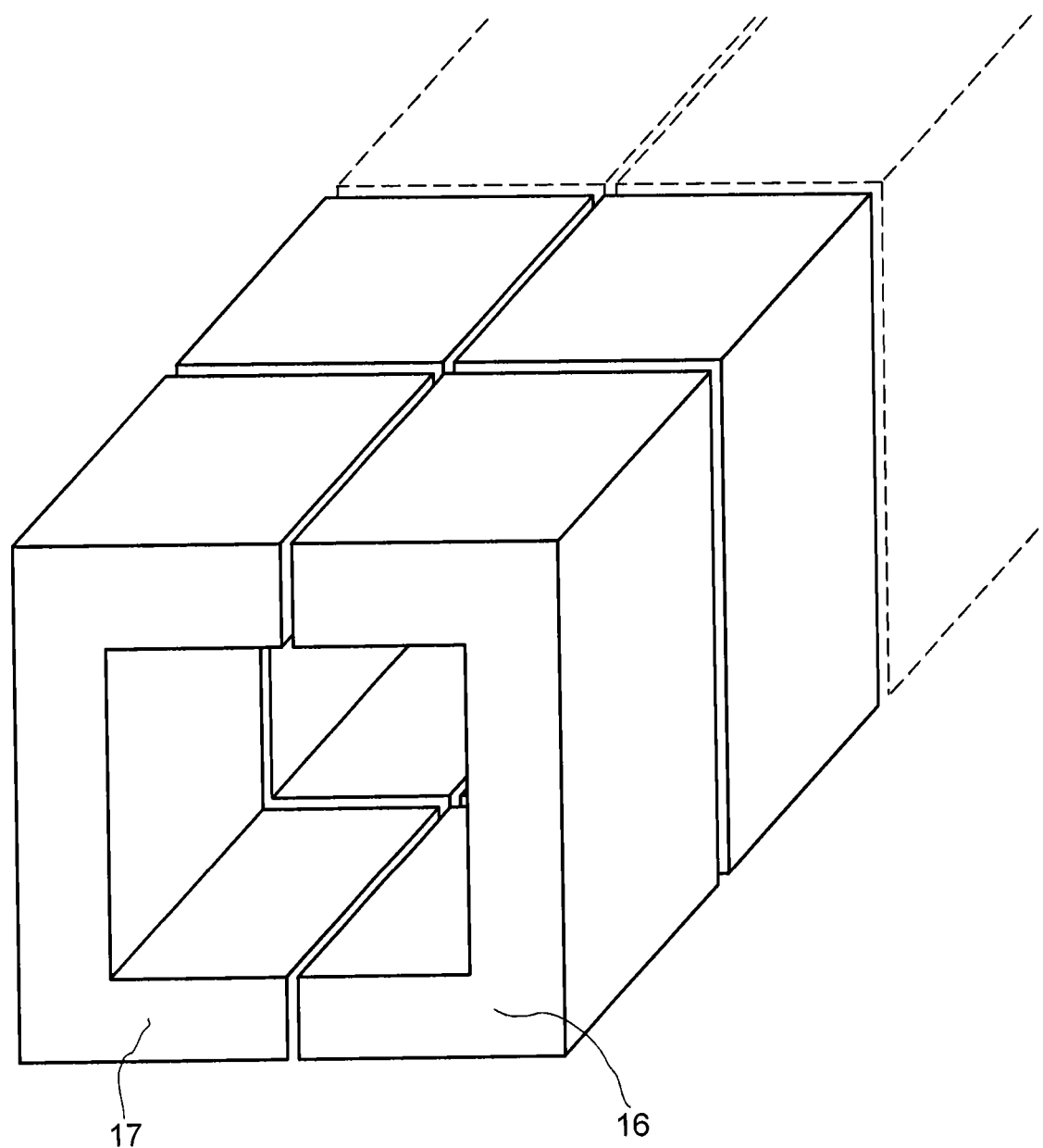
Figure 3:
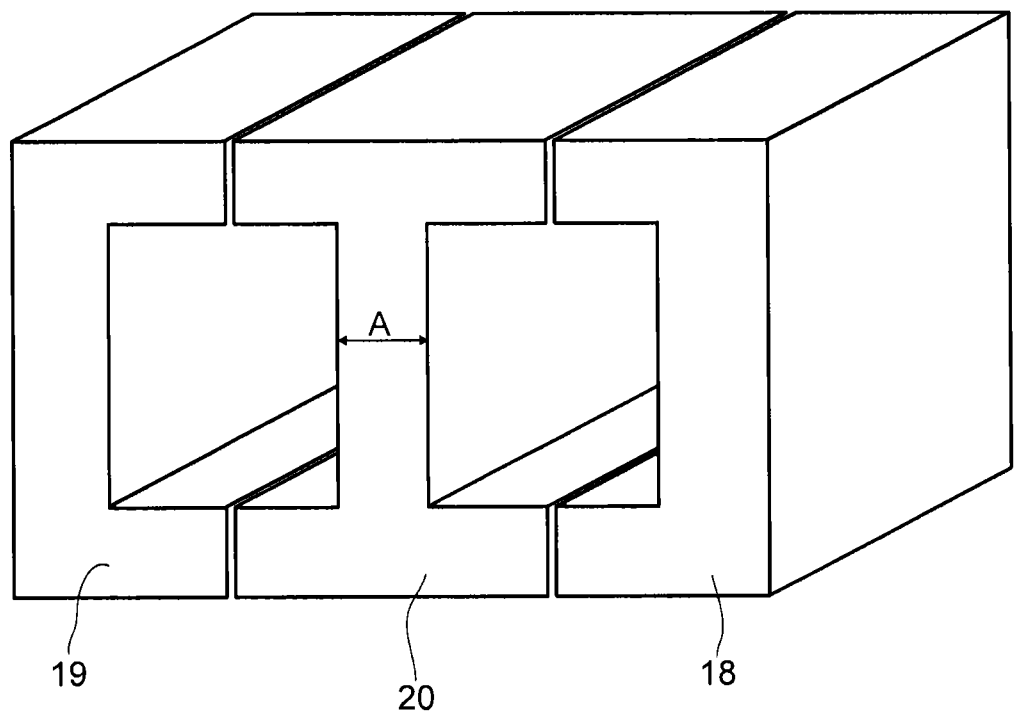
Figure 4:
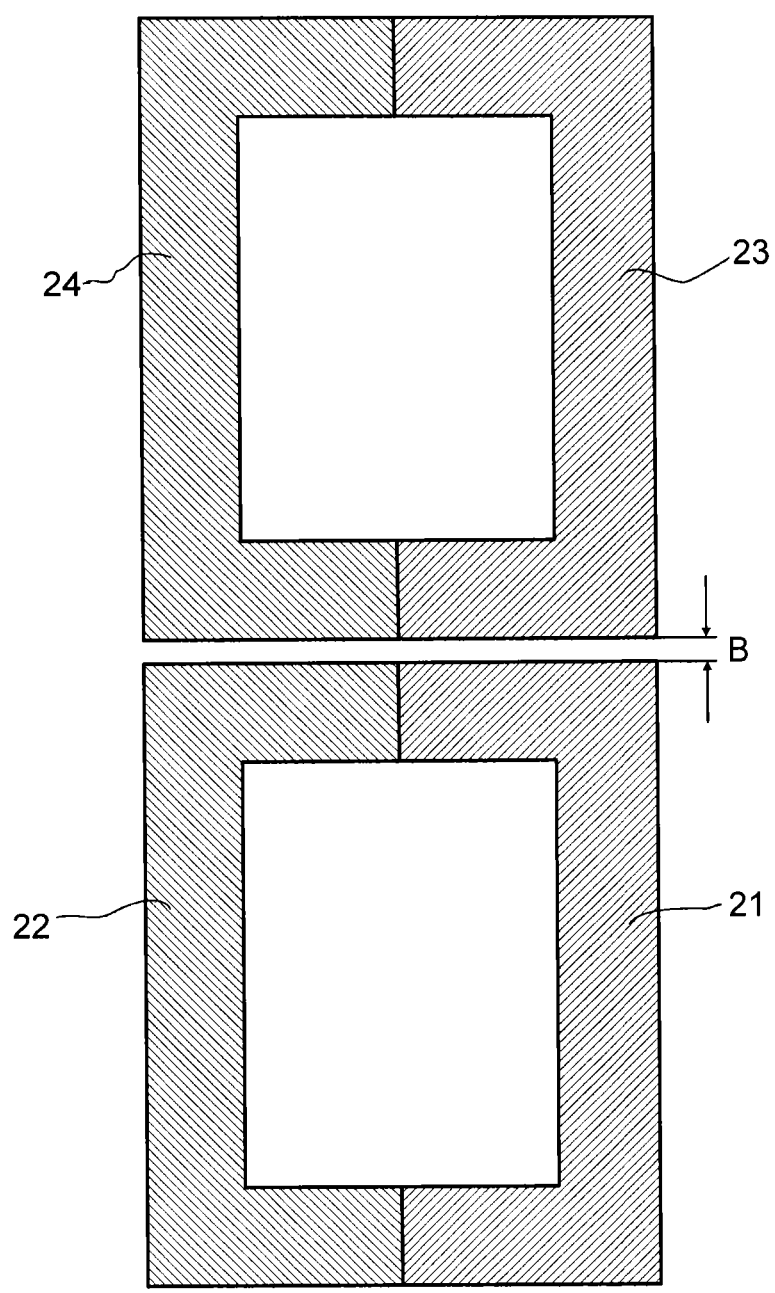

In step (A), the foil is introduced into a gripper-belt system known to the person skilled in the art. It is essential to the invention here that said gripper-belt system has the shape of the profile to be produced. FIGS. 2, 3 and 4 depict possible embodiments of said gripper-belt system in the invention.

A gripper-belt system with an appropriate number of elements is provided in step (A), designed appropriately for the number of cores to be comprised in the profile to be produced. If there is one core present in the profile to be produced, a gripper-belt system with two elements is preferably suitable. If there are two cores present in the profile to be produced, a gripper-belt system with three elements is used. If there are three cores present in the profile to be produced, it is preferable to use a gripper-belt system with four elements. If there are four cores present in the profile to be produced, it is preferable to use a gripper-belt system with five elements. If more than one core is present in the profile to be produced in the invention, these can have been arranged within the profile so as to be alongside one another and/or mutually superposed. The known continuous processes cannot produce a profile of this type with two or four cores.

The gripper-belt system used in the invention is known per se to the person skilled in the art and is described by way of example in DE 102004023881.

In step (A) of the process of the invention, the foil is introduced into the gripper-belt system in such a way that it preferably lies on the floor of the gripper-belt system and, on the sides of the gripper-belt system, is conducted as far as the upper edge. In one preferred embodiment, the dimensions of the foil are such that it overlaps the upper edge of the gripper-belt system and, by virtue of the temperature prevailing in the gripper-belt system, to the extent that the temperature of the gripper-belt system or the temperature of the reacting PU foam is above the Tg or the Tm of the foil used, fuses to itself in such a way that the foil introduced forms a tube, where the shape of the tube is preferably exactly that prescribed by the gripper-belt system for the profile to be produced.

In another preferred embodiment, step (A) is carried out in such a way that when the foil is introduced into the gripper-belt system the jaws have not yet been closed completely. This embodiment makes it easier to introduce the foil and permits crease-free introduction.

It is preferable to introduce the foil into the gripper-belt system by way of a shaping apparatus, preferably a forming shoulder.

Step (A) of the process of the invention is preferably carried out at a temperature from room temperature to 40° C., particularly preferably from room temperature to 30° C.

Step (B):

Step (B) of the process of the invention comprises introducing at least one liquid foamable reactive system of the core comprising at least one polyisocyanate a) and at least one higher molecular compound with groups reactive against isocyanate groups b) into the gripper-belt system, so that any optionally present foil at least to some extent encloses the precursor material. In the invention, a reactive system means a mixture of precursor compounds for the foamed material present in the core.

Step (B) of the process of the invention uses apparatuses known to the person skilled in the art to introduce the material. According to the present invention the components needed for producing the polyurethane foam, in particular a polyisocyanate component and a polyol component, and also the other components mentioned at an earlier stage above are introduced. In one particularly preferred embodiment, the method for step (B) introduces a mixture comprising the diisocyanate component and the polyol component. The mixture is produced from the individual substances in mixing equipment known to the person skilled in the art. By way of example, the catalysts and the blowing agents are metered into the polyol component by way of further metering pumps.

In one particularly preferred embodiment, in which step (A) of the process of the invention has been carried out, at least one liquid foamable reactive system of the core is charged in step (B) into the foil introduced in step (A), and it is preferable here that the foil has formed a tube in step (A) or forms a tube in step (B). The amount of the precursor material to be charged here is judged by the person skilled in the art in such a way that, after foaming, the entire space available for the core has been filled with polyurethane foam.

If step (A) of the process of the invention is not carried out, it is preferable that the gripper-belt system is provided with a release agent before charging of the precursor material in step (B) of the process of the invention.

Any of the blowing agents known to the person skilled in the art is generally suitable, and silicones or waxes are particularly suitable.

Step (B) of the process of the invention is preferably carried out at room temperature, and the temperatures of the starting components for polyurethane production here are those known to the person skilled in the art.

Step (C):

Step (C) of the process of the invention comprises the shaping of the core in the gripper-belt system.

The invention preferably carries out step (C) in such a way that the foamable precursor material introduced in step (B) is foamed in the gripper-belt system. The precursor material here, or the core being formed here, is preferably transported via the movement of the gripper-belt system. In a further preferred embodiment, a train unit, for example two motor-powered wheel systems, are present after the gripper-belt system, that pull the foil, preferably at start, through the gripper-belt system. In a further preferred embodiment, preferably after start, i.e. when the process is running in a stable way, the cured hart foam profile which is surrounded with foil, is transported by a train unit, for example two motor-powered wheel systems.

By virtue of the pressure conditions and temperature conditions prevailing in the gripper-belt system, the precursor materials present, in particular the polyisocyanate component and polyol component, react to give the desired foam. The shaping of the gripper-belt system, or of the foil present in the gripper-belt system, causes the foam to assume the shape of the desired profile during the foaming process. "Overfill", which is a function of the amount introduced and of the free-foamed density, is used to obtain compaction, thus giving the foam high homogeneity and stability.

Step (C) of the process of the invention is preferably carried out at a temperature from room temperature to 55° C., particularly preferably from room temperature to 45° C.

Any gases produced in step (C) during the shaping of the core are preferably not dissipated in the invention, but instead remain within the material of the core. To this end, the amount of precursor material can preferably be judged by the person skilled in the art in such a way that, after the foaming process, the foam charged to the gripper-belt system or to a foil present therein, or to a tube shaped therefrom, has a desired density and quality.

The pressure at which step (C) of the process of the invention is generally carried out is from 0.8 to 1.2 bar (a), preferably from 0.9 to 1.1 bar (a), particularly preferably atmospheric pressure.

Step (D):

The optional step (D) of the process of the invention comprises the cooling of the core from step (C).

Step (D) of the process of the invention is carried out if the temperature of the core made of a polyurethane foam or a mixture comprising a polyurethane foam optionally at least to some extent sheathed by at least one foil is too high for the next step (E) of the process of the invention. Cooling can be carried out by the processes known to the person skilled in the art. By way of example, the core just formed can be passed through an appropriate coolant, such as water or air. In one preferred embodiment, the optional step (D) of the process of the invention is carried out.

The temperature to which the core is preferably cooled in step (D) of the process of the invention is from room temperature to 70° C., preferably from room temperature to 50° C.

Step (E):

Step (E) of the process of the invention comprises introducing the core from step (C) or (D) into an extruder with attached extrusion die for producing annular profiles, in order to sheath the core with a jacket made of at least one thermoplastic material, thus obtaining the profile.

In step (E), the core obtained in step (B) and optionally sheathed by a foil is introduced into an extruder which comprises a die which replicates the shape of the profile. In the extruder of step (E), the thermoplastic material which is to form the jacket is now applied in molten form to the core. Embodiments of this extruder used in the invention are in general terms known to the person skilled in the art and are described by way of example in WO 2009/098068.

Step (E) gives the profile of the invention comprising at least one core made of at least one foamed material, at least one jacket made of at least one thermoplastic material, and optionally at least one foil between core and jacket.

Step (E) of the process of the invention is preferably carried out at a temperature at which the thermoplastic material of the jacket is molten, for example from 100 to 220° C., particularly preferably from 130 to 190° C.

The prevailing temperature at which the thermoplastic material solidifies after leaving the extruder is preferably by way of example from 25 to 180° C., preferably from 50 to 150° C.

Extrusion of thermoplastic materials is known per se to the person skilled in the art and is described by way of example in "Einführung in die Kunststoffverarbeitung" [Introduction to plastics processing], 5$^{th}$ edition, September 2006; pp. 87-180; Walter Michaeli; Hanser Fachbuchverlag.

The present invention also provides the process of the invention where, in step (E), reinforcement is introduced into the gripper-belt system or, respectively, into the extrusion die, i.e. into the profile-shaped die, of the extruder in such a way that said reinforcement system is present in the profile between core and jacket or in essence entirely within the jacket. The presence of reinforcement in this type of profile is known per se to the person skilled in the art. The reinforcement can be composed of any material which appears to the person skilled in the art to be suitable. By way of example, the reinforcement introduced comprises at least one material selected from the group consisting of metals, such as aluminum or iron, plastics, such as polyesters, e.g. polyethylene terephthalate or polybutylene terephthalate, glassfiber-reinforced plastics, and mixtures thereof. Preference is given here to reinforcement made of plastic or of glassfiber-reinforced plastic.

If reinforcement is introduced into the profile in the invention, this reinforcement can have its final shape when it is introduced into the extruder, an example being the shape of a strip. In a second embodiment, the reinforcement is extruded in the extruder simultaneously with the jacket of the profile. To this end, the material of the reinforcement is introduced, preferably in the molten state, along the extruder.

In one preferred embodiment of the invention, the dimensions of the reinforcement are dependent on the dimensions of the profile and can maximize the stability of the reinforced profile. The design of this reinforcement gives reduced heat transmission within the profile, for example in windowframes or doorframes.

Step (F):

The optional step (F) of the process of the invention comprises the cooling of the profile from step (E). This cooling can be carried out by processes known to the person skilled in the art, for example by passing the resultant profile through an appropriate coolant, such as air or water.

The temperature to which the profile is preferably cooled in step (F) of the process of the invention is from room temperature to 60° C., preferably from room temperature to 40° C., achieved by processes known to the person skilled in the art.

Step (G):

The optional step (G) of the process of the invention comprises the cutting of the profile from step (E) or (F) of the process of the invention. Apparatuses for cutting the profile of step (G) are known in general terms to the person skilled in the art, an example being sawing. The continuous process of the invention can in principle produce a continuous profile, and this can therefore be cut in step (G) of the process of the invention into lengths suitable for the application, for example pieces of from 1 to 12 m, preferably from 2 to 8 m.

The invention can provide the resultant profiles with a coating. By way of example, this is necessary or useful when the plastic used for the jacket is not per se resistant to light and/or to weathering. The invention can use a coating based on acrylate or based on aliphatic polyurethane in order to obtain profiles that are resistant to light and/or to weathering. The coating can be applied after production of the jacket, for example after step (E), (F), and/or (G). Processes and apparatuses for coating the jacket are known per se to the person skilled in the art.

The present invention also provides the profile that can be produced via the process of the invention. In relation to the details and to the preferred embodiments, see the statements relating to the process.

The present invention also provides a profile comprising a core made of a polyurethane foam or a mixture comprising a polyurethane foam, a jacket made of at least one thermoplastic material, and optionally a foil between core and jacket. In relation to the details and to the preferred embodiments, see the statements relating to the process.

In one particularly preferred embodiment, the profile of the invention comprises a core made of a polyurethane foam, a jacket made of polyvinyl chloride (PVC), and a foil between core and jacket made of thermoplastic polyurethanes, Teflon, metal, or a composite material comprising metal, textile, and combinations thereof. It is further preferable that the profile of the invention comprises reinforcement, preferably made of the abovementioned materials, particularly preferably made of plastic or of glassfiber-reinforced plastic.

In one preferred embodiment of the profile of the invention, the foil encloses the core at least to some extent, preferably entirely.

In another preferred embodiment, the present invention therefore provides the profile of the invention where the at least one foil comprises at least one material selected from the group consisting of thermoplastic polyurethanes, Teflon, metal, composite material comprising metal, textile, and combinations thereof.

The present invention also provides the use of the profile of the invention for producing windowframes, doorframes, or in the fitting-out of interiors, or in apparatuses in which, during operation, temperature differences arise between interior space and exterior space, examples being cold rooms, air-conditioning equipment, ventilation systems, refrigerators, (deep) freezer chests, or pool covers. The profiles of the invention are preferably used here for edging, or as profile for a space surrounded by a structure.

The present invention also provides an apparatus for carrying out the process of the invention, comprising a unit for introducing the liquid precursor material of the foamed core, optionally a unit for introducing a foil, a gripper-belt system, an extruder with attached extrusion die for producing hollow profiles, and optionally units for cooling and cutting.

It is known that the individual elements of the apparatus of the invention are known to the person skilled in the art.

FIGURES

FIG. 1 shows an apparatus of the invention, where this is preferably used for carrying out the process of the invention. The meanings of the reference signs here are as follows:
1 Profile produced
2 Cooling unit
3 Extruder with profile-shaped die
5 Cooling zone
6 Feed vessel for polyol and optionally additives
7 Feed vessel for diisocyanate
8 Pump 1
9 Pump 2
10 Mixing unit
11 Foil
12 Unwind unit
13 Forming shoulder
14 Gripper-belt system
15 Saw FIG. 2 shows a gripper-belt system which can be used in the invention in order to produce a profile with a foam core. 16 and 17 here indicate the two jaws.

FIG. 3 shows a gripper-belt system which can be used in the invention for producing a profile of the invention with two foam-element cores. Reference signs 18, 19 and 20 here indicate the three jaws of this gripper-belt system. A indicates the separation between the foam elements.

FIG. 4 shows two gripper-belt systems that are arranged one upon the other, where reference signs 21, 22, 23 and 24 describe the single jaws. B describes the distance between the jaws of the gripper-belt.

The invention claimed is:
1. A continuous process for producing a profile consisting of: (i) at least one core made of a polyurethane foam or a mixture comprising a polyurethane foam, (ii) at least one jacket made of at least one thermoplastic material, (iii)

optionally at least one foil between the at least one core and the at least one jacket, (iv) optionally at least one fillet that has been bonded to the jacket and to which further fillets are optionally bonded, and (iv) at least one reinforcement, the process comprising:
- (A) optionally introducing the at least one foil into a gripper-belt which has a shape of the profile;
- (B) introducing at least one liquid, foamable reactive system for making the at least one core comprising at least one polyisocyanate and at least one higher molecular compound with groups reactive towards isocyanate groups, into the gripper-belt in such a way that any foil present at least to some extent encloses the precursor material;
- (C) shaping the at least one core in the gripper-belt;
- (D) optionally cooling the shaped at least one core from (C);
- (E) introducing the at least one core from (C) or (D) into an extruder with an attached extrusion die for producing hollow profiles to sheath the at least one core with the at least one jacket and obtain the profile;
- (F) optionally cooling the profile from (E);
- (G) optionally cutting the profile from (E) or (F);
- (H) optionally bonding the at least one fillet to the at least one jacket and optionally bonding the further fillets thereto; and
- (I) introducing the at least one reinforcement into at least one of the gripper-belt and the extrusion die of the extruder in at least one of (A) (B), and (E), respectively, so that the at least one reinforcement is present in the profile between the at least one core and the at least one jacket or entirely within the at least one jacket, wherein the at least one reinforcement comprises a strip-shaped reinforcement.

2. The continuous process according to claim 1, wherein the at least one thermoplastic material is selected from the group consisting of a polyolefin, a polycondensate, a polyadduct, a wood-plastic composite, and a mixture thereof.

3. The continuous process according to claim 1, wherein the at least one foil is present between the at least one core and the at least one jacket in the profile.

4. The continuous process according to claim 1, wherein the at least one fillet is bonded to the jacket in the profile.

5. The continuous process according to claim 4, wherein further fillets are bonded to the at least one fillet in the profile.

6. The continuous process according to claim 3, comprising (A) introducing the at least one foil into a gripper-belt which has a shape of the profile.

7. The continuous process according to claim 1, comprising (D) cooling the shaped at least one core from (C).

8. The continuous process according to claim 1, comprising (F) cooling the profile from (E).

9. The continuous process according to claim 8, comprising (G) cutting the profile from (E) or (F).

10. The continuous process according to claim 5, comprising (H) bonding the at least one fillet to the at least one jacket and bonding the further fillets thereto.

11. The continuous process according to claim 1, wherein:
- the at least one foil is present between the at least one core and the at least one jacket in the profile;
- the at least one fillet is bonded to the jacket in the profile;
- further fillets are bonded to the at least one fillet in the profile; and
- the process comprises:
- (A) introducing the at least one foil into a gripper belt which has a shape of the profile;
- (D) cooling the shaped at least one core from (C);
- (F) cooling the profile from (E);
- (G) cutting the profile from (E) or (F); and
- (H) bonding the at least one fillet to the at least, one jacket and bonding the further fillets thereto.

12. The continuous process according to claim 1, wherein the gripper-belt has a shape of the profile and at least two shaping jaws.

13. The continuous process according to claim 12, wherein the gripper-belt has a shape of the profile and at least three shaping jaws.

* * * * *